(12) United States Patent
Crumly et al.

(10) Patent No.: US 10,061,997 B2
(45) Date of Patent: Aug. 28, 2018

(54) HANDWRITING CAPTURE TECHNIQUES (75) Inventors: Lyndley Crumly, Frazier Park, CA (US); David Clark, Morgan Hill, CA (US)

(73) Assignee: Apple Inc., Cupertino, CA (US)

( * ) Notice: Subject to any disclaimer, the term of this patent is extended or adjusted under 35 U.S.C. 154(b) by 2207 days.

(21) Appl. No.: 13/084,355

(22) Filed: Apr. 11, 2011

(65) Prior Publication Data

US 2012/0256944 A1    Oct. 11, 2012

(51) Int. Cl.
*G06T 15/40* (2011.01)
*G06K 9/22* (2006.01)
*G06F 3/0488* (2013.01)

(52) U.S. Cl.
CPC .......... *G06K 9/222* (2013.01); *G06F 3/04883* (2013.01)

(58) Field of Classification Search
CPC .............................. G06K 9/22; G06F 3/04883
USPC ....................................................... 345/173
See application file for complete search history.

(56) References Cited

U.S. PATENT DOCUMENTS

| 7,139,430 | B2 | 11/2006 | Sparr et al. |
| 7,486,824 | B2 | 2/2009 | Clary et al. |
| 2002/0042885 | A1 | 4/2002 | Eskandarian |
| 2003/0194148 | A1 * | 10/2003 | Haeberli ........................ 382/283 |
| 2008/0256155 | A1 * | 10/2008 | Hayes ........................... 708/290 |

OTHER PUBLICATIONS

Michael J. Banks et al., "Realtime Spline Curves from Interactively Sketched Data", Computer Science, University of Utah, Salt Lake City, UT 84112; Proceeding I3D '90 Proceedings of the 1990 symposium on Interactive 3D graphics; ACM New York, NY, USA © 1990; ISBN:0-89791-351-5 DOI>10.1145/91385.91425; Newsletter ACM SIGGRAPH Computer Graphics Homepage; vol. 24 Issue 2, Mar. 1990; ACM New York, NY, USA.

* cited by examiner

*Primary Examiner* — Robert Craddock
(74) *Attorney, Agent, or Firm* — Fish & Richardson P.C.

(57) ABSTRACT

A set of rules is used by a processor of a device to render a digital image of handwriting (e.g., handwritten signature) by connecting data points captured on a touch sensitive surface of the device with line segments or curves. A set of rules determines whether two given data points will be connected by a line segment or a curve. If a curve is used, the set of rules determine characteristics of the curve through the derivation of control points. In some implementations, a smoothness adjustment factor can be applied to magnitudes of curve control points to reduce excessive smoothing for large distances between data points and maintain acceptable smoothing for short distances between data points. The magnitude can then be adjusted by multiplying by a constant factor which can be determined (e.g., heuristically) from the processing speed and resolution of the device upon which the curve is being rendered.

20 Claims, 13 Drawing Sheets

HANDWRITING CAPTURE TECHNIQUES

TECHNICAL FIELD

This disclosure relates generally to techniques for capturing handwriting (e.g., handwritten signature) on a touch sensitive surface of an electronic device.

BACKGROUND

Modern mobile devices (e.g., electronic tablets) can run applications that allow a user to capture their handwritten signature using a touch sensitive surface. For example, some delivery companies provide their delivery personnel with handheld devices that allow a customer to sign for a package by writing their signature on a touch sensitive display surface of the device using a finger or stylus. Unfortunately, if the device is capable of capturing only a few signature data points per second, and if the finger or stylus is moved quickly, there may be an insufficient number of signature data points to generate a smooth and continuous rendering of the signature.

SUMMARY

A set of rules is used by a processor of a device to render a digital image of handwriting (e.g., a handwritten signature) by connecting data points captured on a touch sensitive surface of the device with line segments or curves. A set of rules determines whether two given data points will be connected by a line segment or a curve. If a curve is used, the set of rules determine characteristics of the curve through the derivation of control points. In some implementations, a smoothness adjustment factor can be applied to magnitudes of curve control points to reduce excessive smoothing for large distances between data points and maintain acceptable smoothing for short distances between data points. The magnitude can then be adjusted by multiplying by a constant factor which can be determined (e.g., heuristically) from the processing speed and resolution of the device upon which the curve is being rendered.

Particular implementations of handwriting capture techniques provide one or more of the following advantages. Smooth and continuous rendering of handwriting (e.g., electronic signatures) can be produced from a small set of data points captured by a touch sensitive surface.

The details of one or more disclosed implementations are set forth in the accompanying drawings and the description below. Other features, aspects, and advantages will become apparent from the description, the drawings and the claims.

BRIEF DESCRIPTION OF THE DRAWINGS

FIG. 1D illustrates the layout of FIG. 1 with the signature capture field including the signature captured from the signature capture screen of FIG. 1C.

Like reference symbols in the various drawings indicate like elements.

DETAILED DESCRIPTION

Exemplary Database Layout with Signature Container Field

Figure 1A:
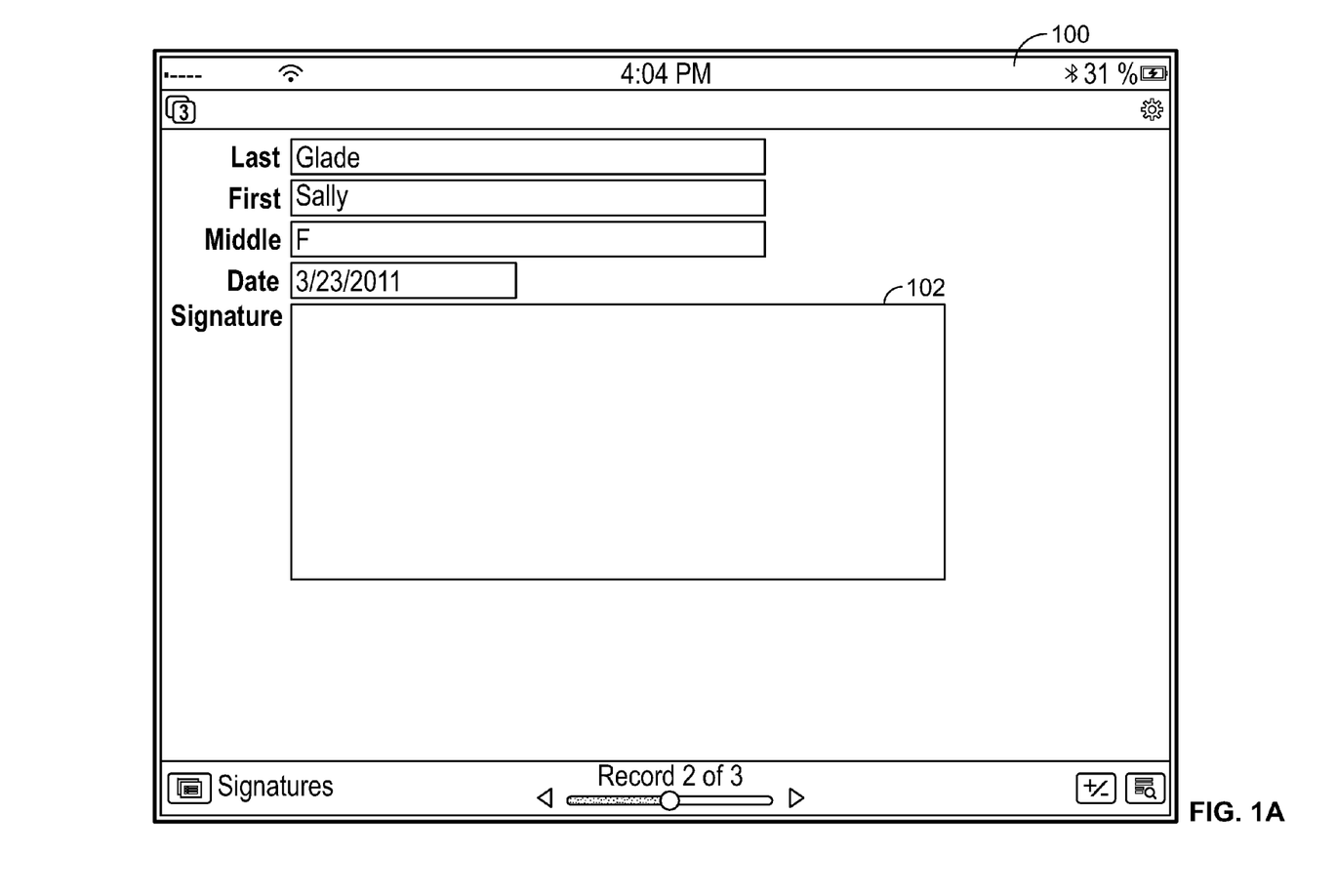
FIG. 1A illustrates an exemplary layout for a database application including a signature field.
Figure 1B:
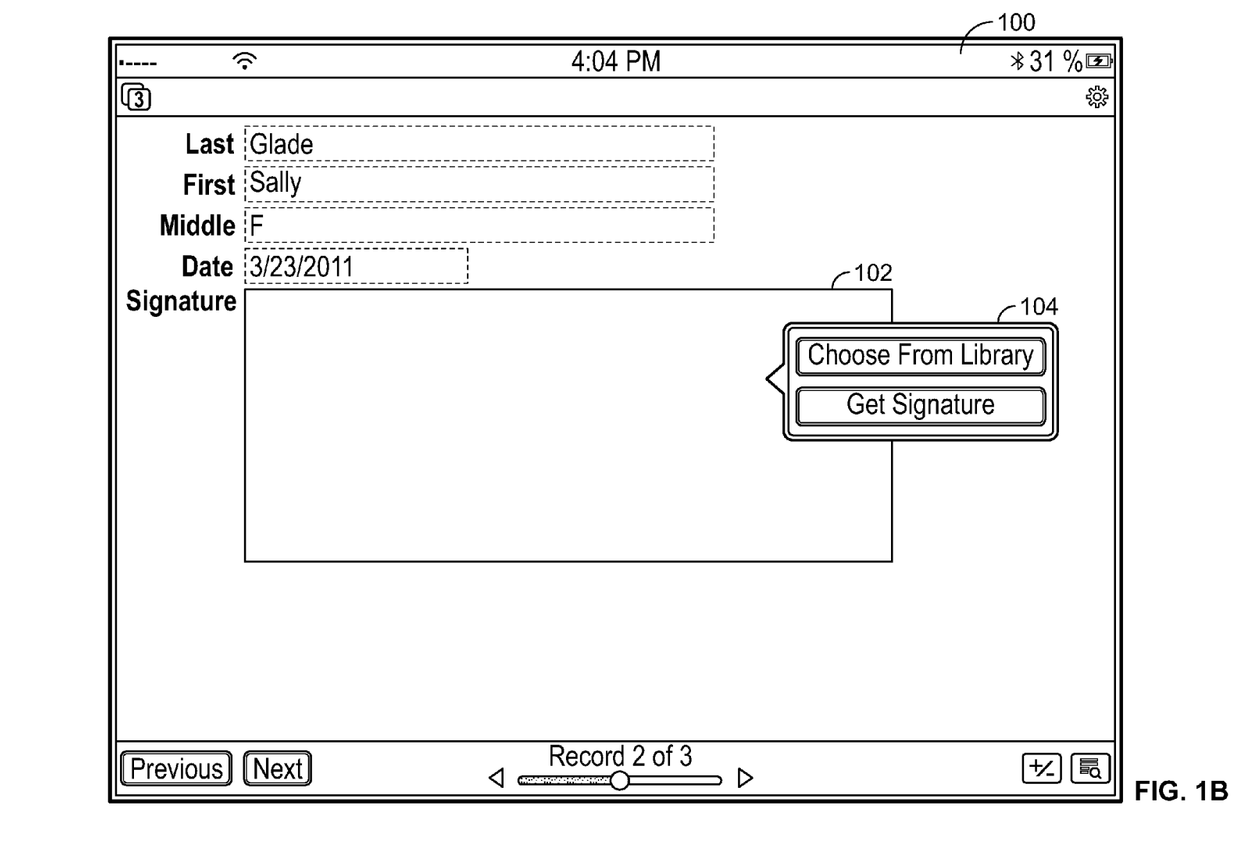
FIG. 1B illustrates an exemplary user interface element for selecting signature retrieval options.

FIG. 1A illustrates an exemplary form 100 in a database application including a signature field 102. In the example shown, form 100 can be designed by a user of a database application. When the user touches or otherwise interacts with signature field 102, user interface element 104 appears on form 100, as illustrated in FIG. 1B. In this example, user interface element 104 includes two buttons: one for selecting a signature from a signature library and one for capturing a signature. When the user selects the "Get Signature" option, a signature capture screen 106 is displayed.

Figure 1C:
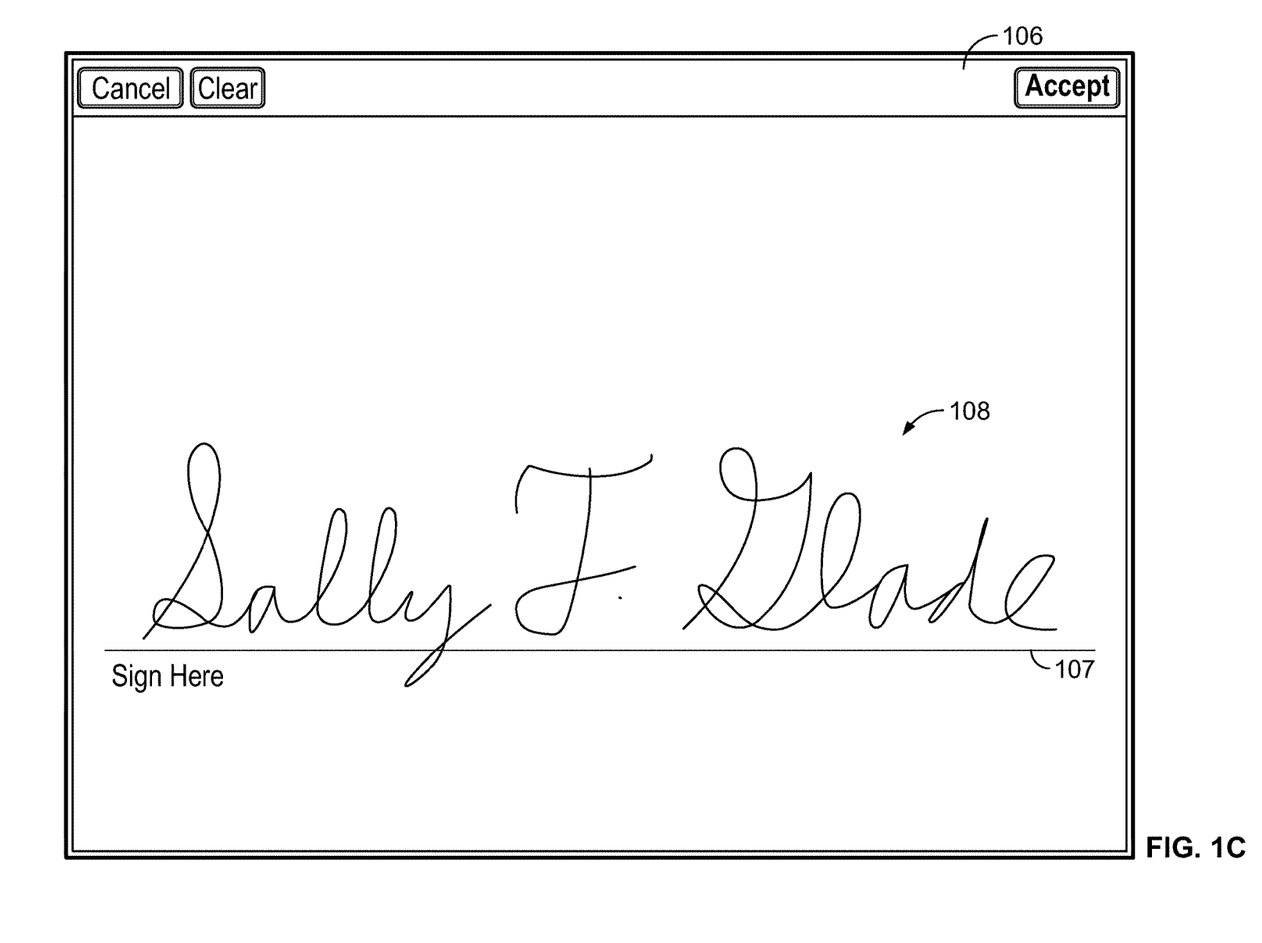
FIG. 1C illustrates an exemplary signature capture screen.

FIG. 1C illustrates an exemplary signature capture screen 106. Signature capture screen 106 includes signature line 107 for signature 108. When the user has finished writing signature 108 on signature line 107 with a finger or stylus, and presses the "Accept" button (on top of capture screen), signature 108 is captured and processed into a digital image format suitable for use by the database application or other applications (e.g., .png format, JPEG, TIFF, bitmap). FIG. 1D illustrates form 100 of FIG. 1 with signature 108 captured from signature capture screen 106 displayed in signature field 102.

Handwriting capture using a touch sensitive surface can be implemented using a variety of touch sensor technologies, including but not limited to: electrically-sensitive (capacitive), acoustically-sensitive (Surface Acoustic Wave) and photo-sensitive technologies. The handwriting capture device (e.g., an electronic tablet) coverts signature data points (e.g., x and y coordinate data) detected by pressure sensors to a vector and transmits the data points to a processor.

Exemplary Handwriting Capture Rules

Bézier curves are parametric curves that are widely used in computer graphics to model smooth curves. When complex shapes are needed (e.g., handwritten signatures), low order Bézier curves can be patched together into "paths." In some implementations, a cubic Bézier curve can be used to capture handwriting. Four points $P_0$, $P_1$, $P_2$ and $P_3$ in the plane or in three-dimensional space define a cubic Bézier curve. The curve starts at $P_0$ going toward $P_1$ and arrives at $P_3$ coming from the direction of $P_2$. Usually, it will not pass through $P_1$ or $P_2$; these points provide directional information. The distance between $P_0$ and $P_1$ determines how long the curve moves into direction $P_2$ before turning towards $P_3$. For some choices of $P_1$, $P_2$ the curve may intersect itself, or contain a cusp. The parametric form of the cubic Bézier curve is given by $$B(t)=(1-t)^3 P_0+3(1-t)^2 t P_1+3(1-t)t^2 P_2+t^3 P_3, t\in[0,1]. \quad [1]$$

A set of rules will now be described for capturing handwriting (e.g., a handwritten signature) from a touch sensitive surface using cubic Bézier curves.

Rule 1: A single data point is not drawn unless no further data points are being added. In that case, it is drawn as a point.

Rule 2: A straight-line segment is always drawn from the first data point to the second data point. Although a curve can be drawn between these data points once a third data point is available, a curve is unnecessary due to the low velocity with which line drawing is generally begun, and the difficulty for the user of starting out a line with a curve without a portion of the line already drawn for reference.

Rule 3: Three data points will cause the drawing of a curve once a fourth point is available to allow the determination of the direction of the end of the curve. If no fourth point is available, the third data point can be added again to be the final data point as noted below. As each new data point is added, it is used in conjunction with the previous three data points to add a curve from the second data point to the third data point. All four of the data points are used to set the angle and magnitude of the control points for the curve.

Rule 4: For the control point at the beginning of the curve, the direction of the control point is set to be the same as the direction vector from the first to the third data points. This provides that the direction of the curve through the second data point will be adjusted to be close to the direction vector from the first to the third data point and that entry and exit of the curve through the second data point will be smooth with no abrupt change of direction.

In some implementations, the magnitude of the control point at the beginning of the curve is set using the distance between the second and third data points. This magnitude can be modified using a smoothness adjustment factor, which can be derived by applying a power function of the form $$f(x)=kx^a,\qquad [2]$$

where x is the distance between the second and third data points, a is a power factor (e.g., a=0.75) and k is a constant scale factor. The power function [2] is used to reduce the excessive smoothing that otherwise occurs as the distance between the points becomes larger if a linear scaling of the control point magnitude is applied and maintains acceptable smoothing of very short distances between data points. The magnitude can then be adjusted by multiplying the magnitude by the constant scale factor k which can be determined (e.g., heuristically) from the processing speed and resolution of the device upon which the curve is being rendered.

Rule 5: The control point at the end of the curve can be created in the same manner as the control point at the beginning of the curve, using the fourth and second data points instead of the first and third data points to reverse the direction of the control point relative to the third data point which is the endpoint of the curve in this example. In general, the method of deriving the end control point using the fourth and second data points is symmetric with the method of deriving the beginning control point using the first and third data points including the scaling and power function applied to the current distance between the second and third data points. This symmetry provides uniform handling of the curve at all points which avoids discontinuities or abrupt transitions.

Note that the fourth and second data points will become the third and first data points, respectively, when the next curve is added during the next iteration of the process described above for the next path of the handwriting. This ensures that the control points for the curves that end at a particular point are in opposite directions, although not always of equal magnitude, so the curve through the data point will have no abrupt change of direction (corner) at the end of the curve and will be smooth. The difference in magnitude allows the curve to be smoother when the adjoining data point is further away, since this allows more distance for the curve to change direction and the curve need not be as sharp, so the smoothing can be applied over a greater distance.

Rule 6: The final data point is added to the path twice to draw the final curve. Consequently, the final data point is also used for creating the final control point which will point directly back at the previous data point on the curve. The final curve will therefore be curved through the penultimate data point and will be straight at its terminus on the final data point.

Rule 7: The minimum distance between data points is set to be equal to the line width used to draw the line segments. If the data points are closer than this, the segment is degenerate and is discarded to provide smoothness.

Rule 8: For segments of less than three times the line width, a straight line is drawn, both for speed and for simplicity, since no useful curving of the line can occur within this span.

In the foregoing rules, no provision has been made for adding corners to the curve. Since this process is applied to physical drawing devices, generally a finger or stylus, and drawing of a corner requires the drawing device to decelerate to an effective stop, which creates a corner within the line, no special handling for this situation is provided as it would for drawing lines using data points created by virtual devices.

After the data points are processed and the handwriting is rendered, a rectangle can be created which includes the rendered handwriting. This rectangle can be used at the conclusion of the process (if the user accepts the signature as shown in FIG. 1B) to crop to the actual area of the signature. A border can then be added around the cropped area, and the resulting digital image of the handwriting can be stored with a transparent background for direct inclusion in signature blocks and other applications.

Some examples of equations for deriving the control points cp1 and cp2 for the current curve from p2 to p3 when p1 is the point preceding p2 and p4 is the point following p3 are as follows:

```
double currentSegmentLength = sqrt((p3.x – p2.x) * (p3.x – p2.x) +
(p3.y – p2.y) * (p3.y – p2.y));
double prevPlusCurrentSegmentLength = sqrt((p3.x – p1.x) * (p3.x –
p1.x) + (p3.y – p1.y) * (p3.y – p1.y));
double nextPlusCurrentSegmentLength = sqrt((p4.x – p2.x) * (p4.x –
p2.x) + (p4.y – p2.y) * (p4.y – p2.y));
double smoothnessAdjustmentFactor = 1.0; // Adjust for best perceived
results on a particular device
double reducedSmoothnessFactor = pow(currentSegmentLength, 0.75); //
To keep smoothness from varying too much as segments become longer
and shorter
prevPlusCurrentSegmentLength = prevPlusCurrentSegmentLength < 1.0 ?
1.0: prevPlusCurrentSegmentLength; // No zero divide
nextPlusCurrentSegmentLength = nextPlusCurrentSegmentLength < 1.0 ?
1.0: nextPlusCurrentSegmentLength; // No zero divide
cp1.x = p2.x + ((p3.x – p1.x) / prevPlusCurrentSegmentLength) *
smoothnessAdjustmentFactor *reducedSmoothnessFactor;
cp1.y = p2.y + ((p3.y – p1.y) / prevPlusCurrentSegmentLength) *
smoothnessAdjustmentFactor *reducedSmoothnessFactor;
cp2.x = p3.x + ((p2.x – p4.x) / nextPlusCurrentSegmentLength) *
smoothnessAdjustmentFactor *reducedSmoothnessFactor;
cp2.y = p3.y + ((p2.y – p4.y) / nextPlusCurrentSegmentLength) *
smoothnessAdjustmentFactor * reducedSmoothnessFactor;
```

Example Application of Rules

Figure 2A:
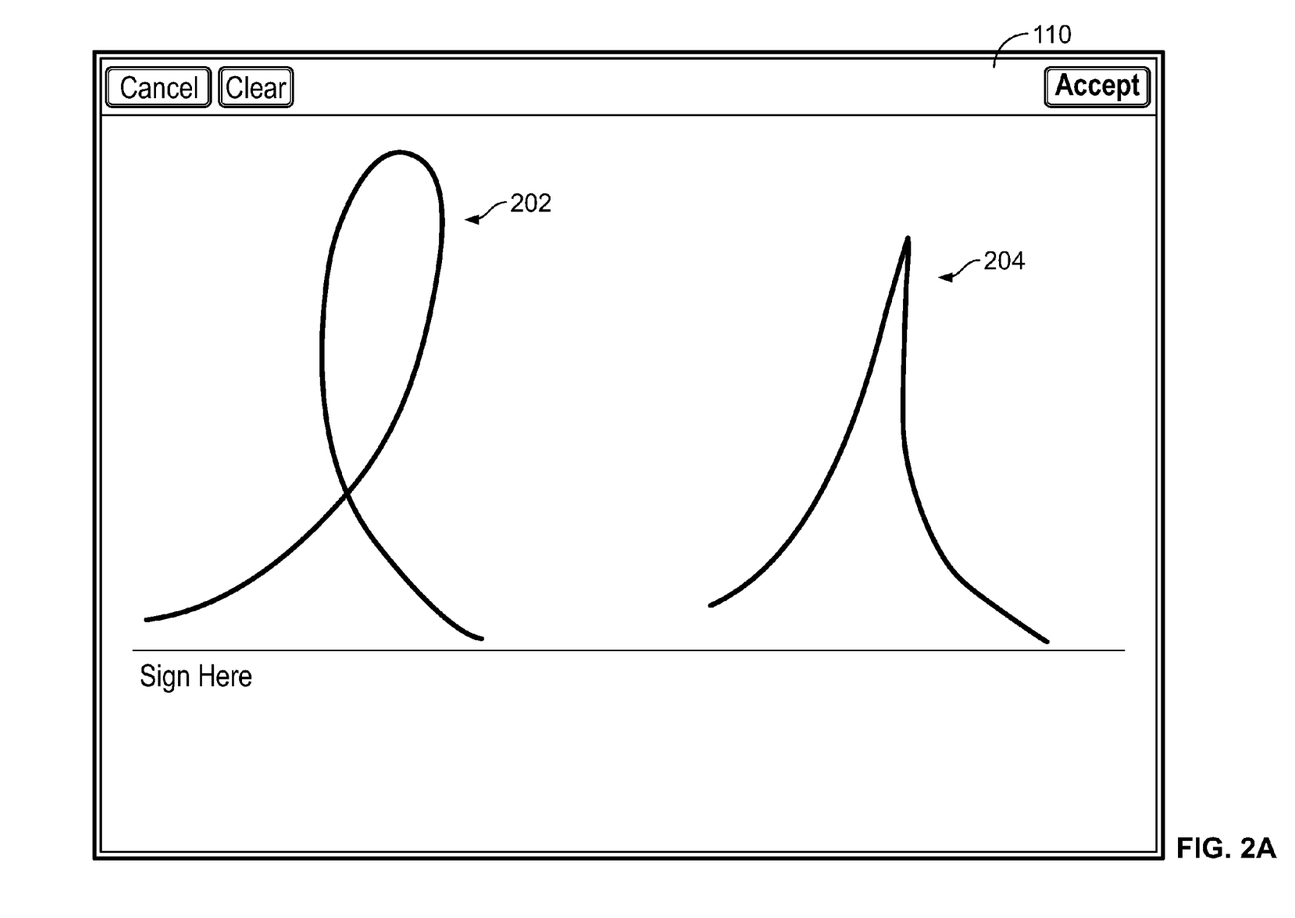
FIGS. 2A and 2B illustrate smoothing functions for a simple curve and for a stroke that results in a point.
Figure 2B:
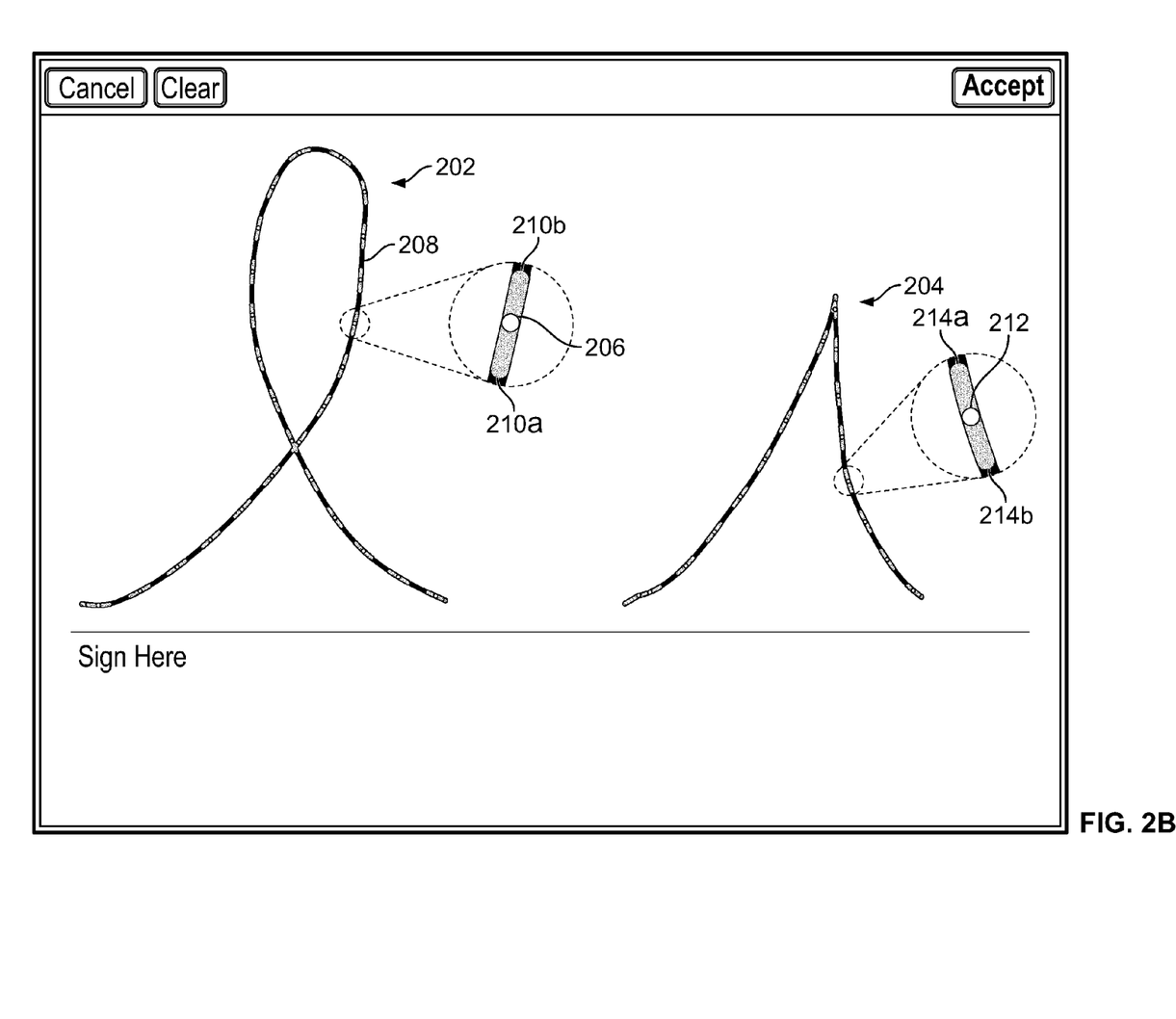

FIG. 2A illustrates a simple curve 202 and a stroke 204 that results in a point. In FIG. 2B, simple curve 202 includes 16 data points. Only data point 206 is designated for discussion purposes. For simple curve 202, a line has been drawn between each data point and the control points for that data point. The magnitude and direction of control points 210a, 210b determine the characteristics (e.g., shape) of the curve 208 through data point 206.

For stroke 204, a line has been drawn between each data point and the control points for that data point. The magnitude and direction of control points 214a, 214b determine the characteristics (e.g., shape) of the curve through data point 212.

Simple curve 202 and stroke 204 can be rendered by concatenating curves connecting data points. The smoothness of the loop of simple curve 202 and the smoothness of the point of stroke 204 are a result of applying the power function described above. Note that there is a reduced distance between data points due to the effective deceleration of the finger or stylus, which provides a sharp point without any additional algorithmic processing for stroke 204.

Figure 3A:
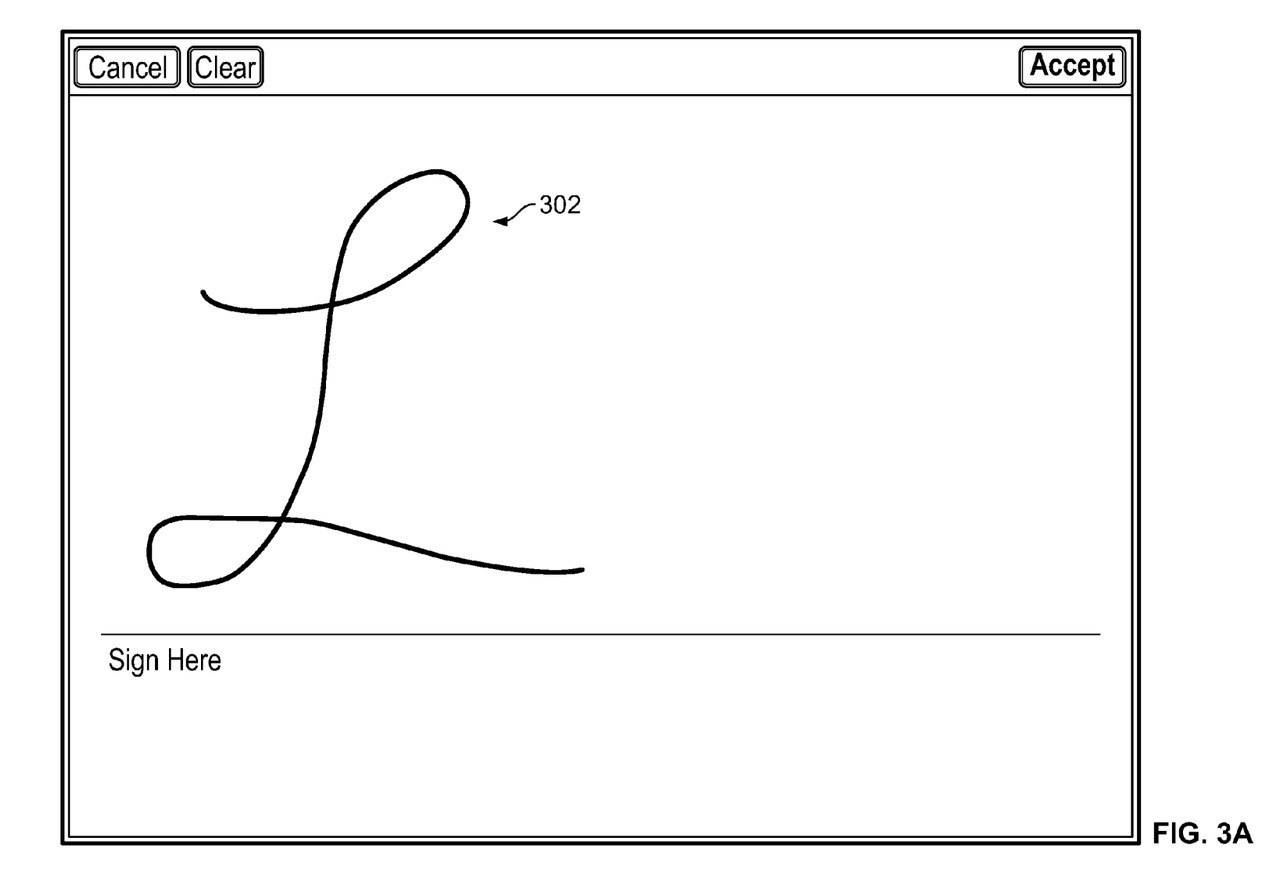
FIGS. 3A and 3B illustrate a simple letter with and without internal control points.
Figure 3B:
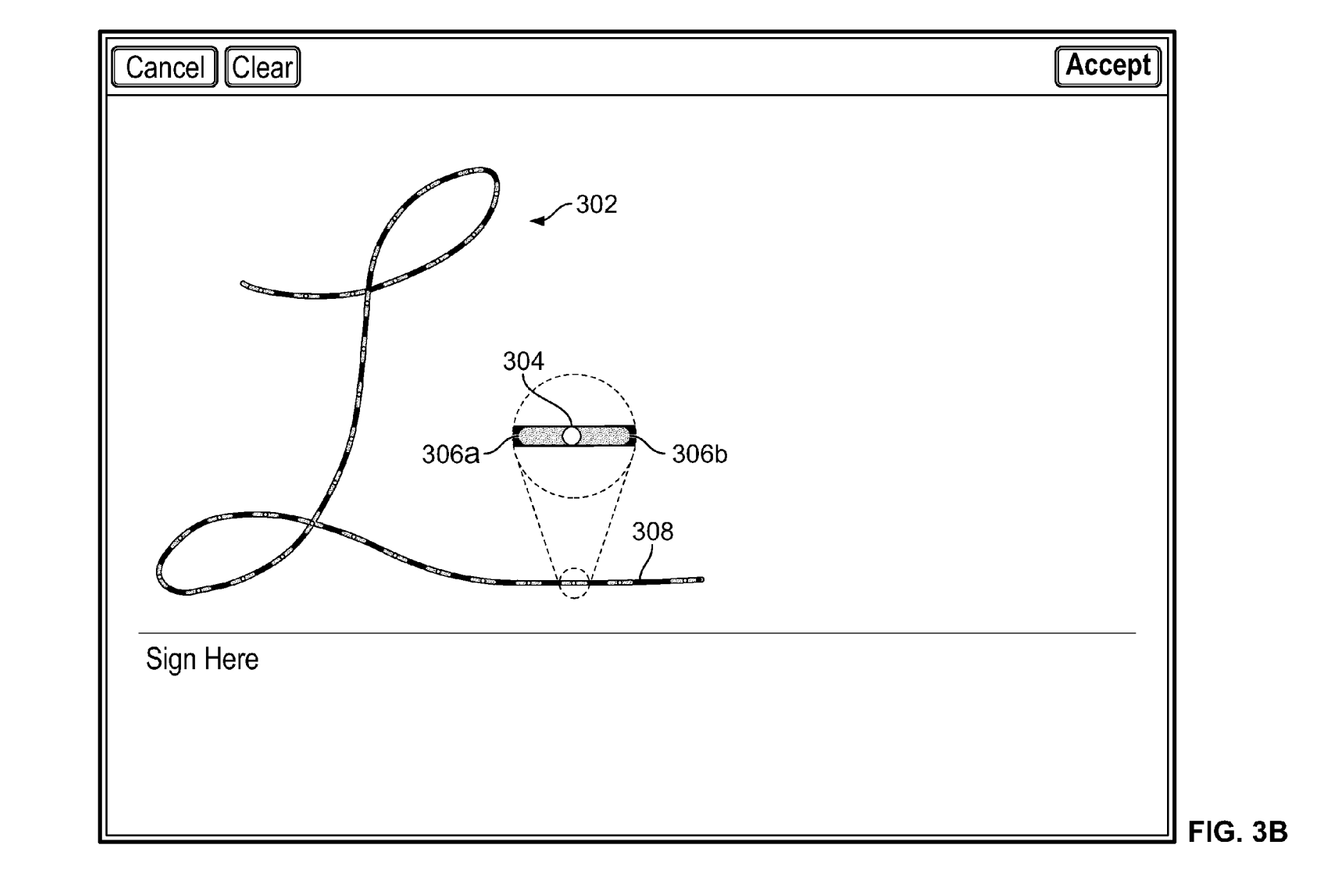

FIG. 3A illustrate a simple handwritten letter 302. In FIG. 3B, internal control points are also shown. Only data point 304 is designated for discussion purposes. For illustration purposes, a line has been drawn between each data point and the control points for that data point. The magnitude and direction of control points 306a, 306b determine the characteristics of curve 308 through data point 304. Letter 302 can be rendered by concatenating curves connecting data points. The smoothness of the loops at the top and bottom of letter 302 are a result of applying the power function described above.

Figure 4A:
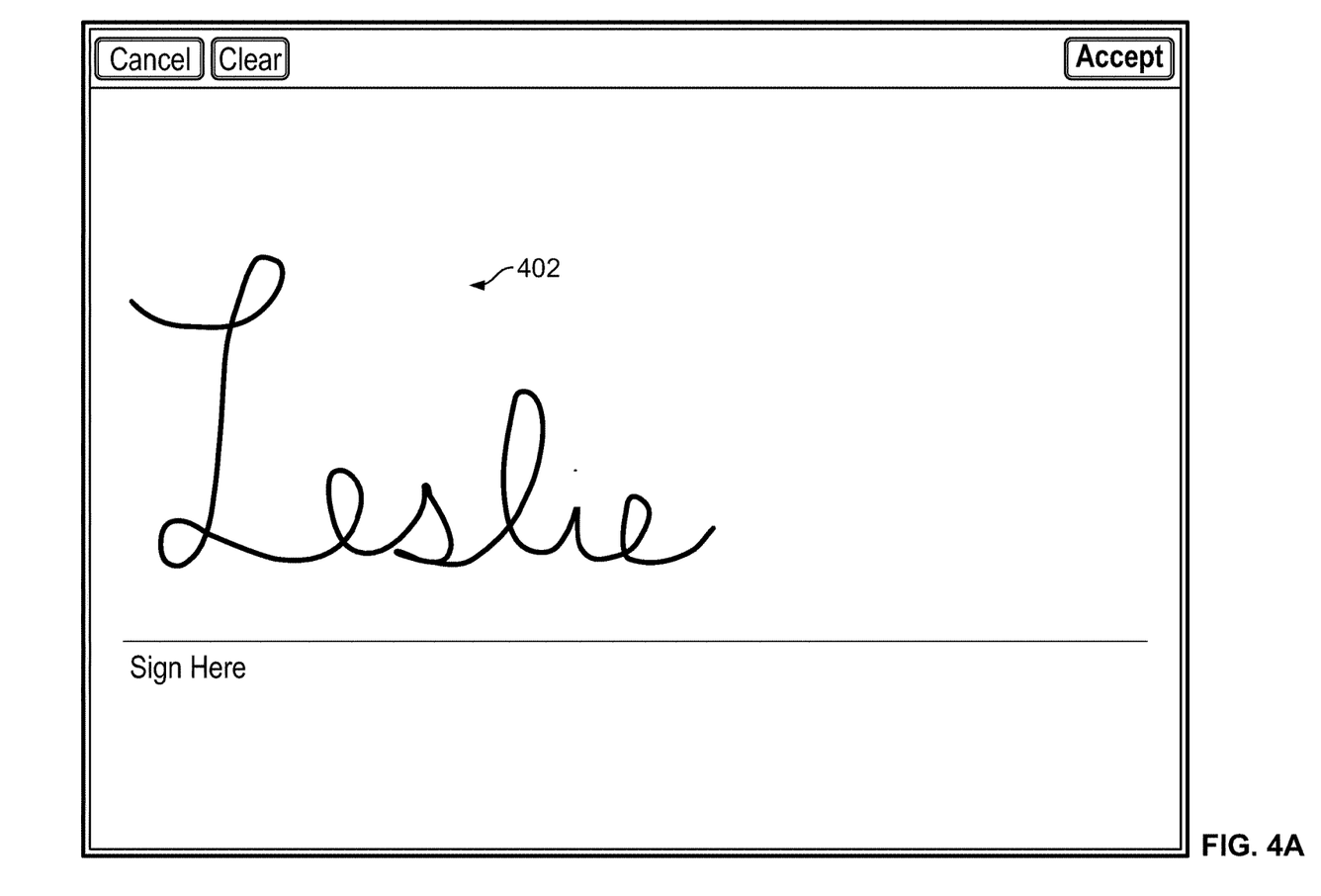
FIGS. 4A and 4B illustrate an electronic signature with and without internal control points.
Figure 4B:
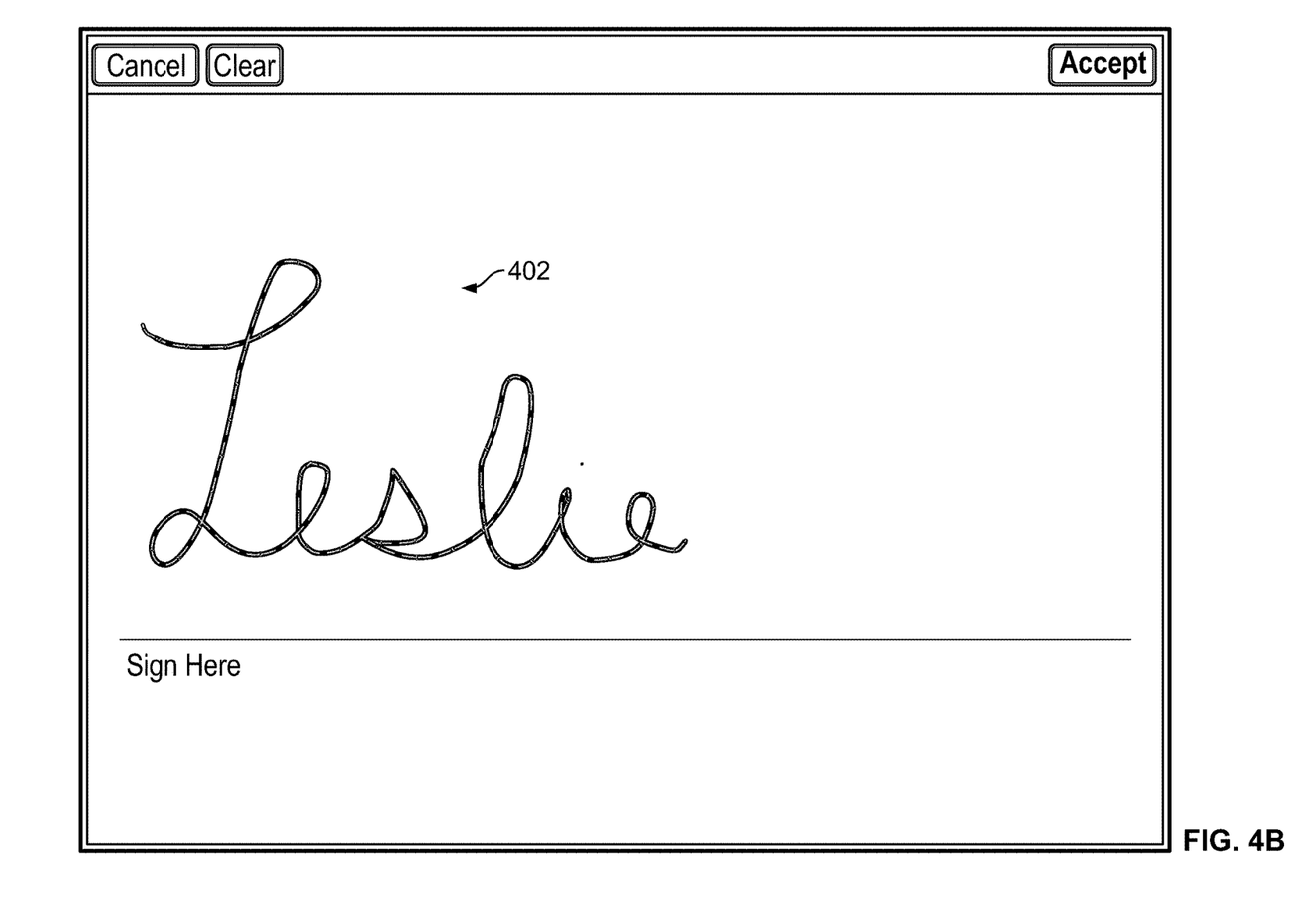

FIGS. 4A and 4B illustrate an electronic signature 402 with and without internal control points. As can be observed, the derived control points and smoothing functions enables a smooth and continuous rendering of signature 402, in particular around the simple curves and strokes contained in signature 402.

Exemplary Process Flow

Figure 5:
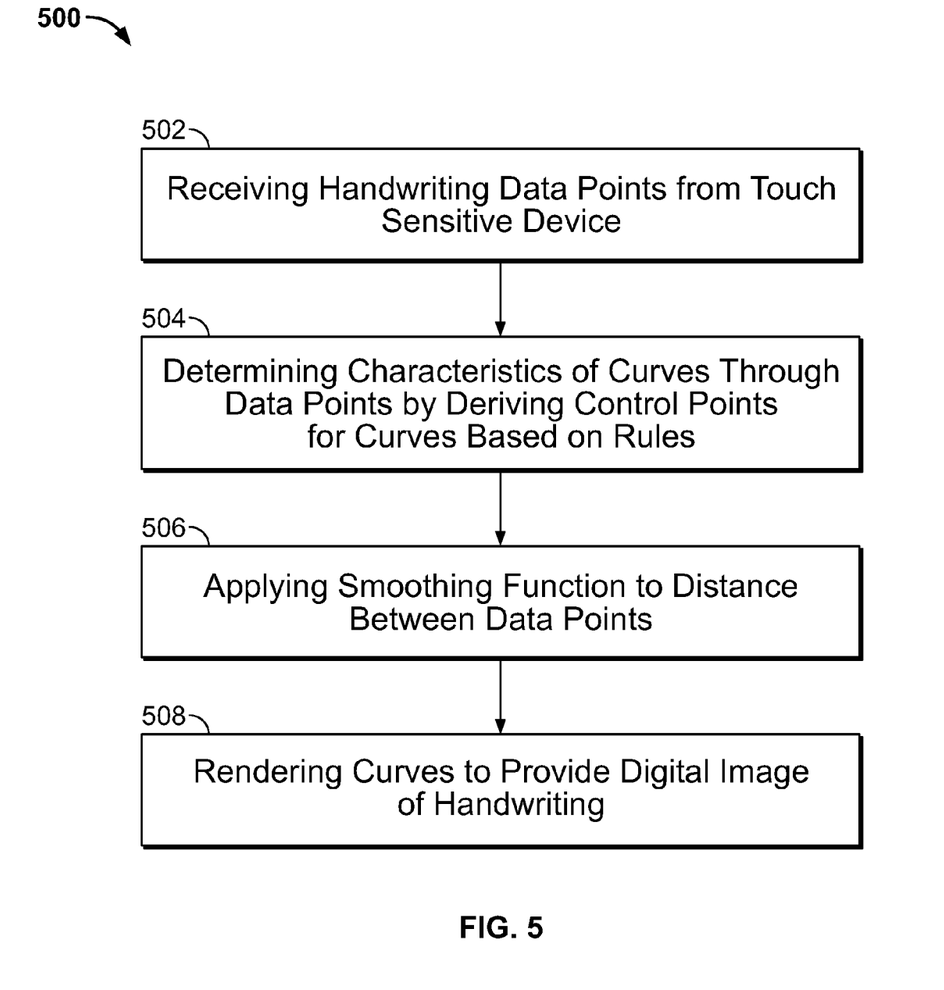
FIG. 5 is a flow diagram of an exemplary process for rendering a digital image of handwriting captured on a touch sensitive surface of a device using a set of rules and smoothing adjustments.

FIG. 5 is a flow diagram of an exemplary process 500 for rendering a digital image of handwriting captured on a touch sensitive surface of a device using a set of rules and smoothing adjustments. Process 500 can be implemented by device architecture 600, as described in reference to FIG. 6.

In some implementations, process 500 can begin by receiving handwriting data points from a touch sensitive device (502). Handwriting (e.g., a handwritten signature) can be captured on a touch sensitive surface (e.g., a touch sensitive display) of a touch sensitive device (e.g., computer, mobile phone, electronic tablet).

Process 500 can continue by determining characteristics (e.g., shape) of curves through the data points by deriving control points for the curves based on a set of rules (504). For example, the set of rules and equations described above can be used to derive control points for each curve in the handwriting.

Process 500 can continue by applying a smoothing function to distances between data points (506). For example, a power function can be applied to the distance to reduce excessive smoothing that otherwise occurs as the distance between the data points becomes larger if a linear scaling of the control point magnitude is applied, and maintains acceptable smoothing of very short distances between points.

Process 500 can continue by rendering the curves to provide a digital image of the handwriting (508). For example, a cubic Bézier curve formulation can be used to render the curves, which can be concatenated to render the handwriting represented by the data points.

In some implementations, a rectangle can be created which includes the rendered handwriting. The rectangle can be created when the handwriting is accepted by the user. The rectangle can be used to crop the actual area of the handwriting. A border can be added around the cropped area, and the resulting digital image can be stored with a transparent background for inclusion in signature blocks or other applications.

Exemplary Device Architecture

Figure 6:
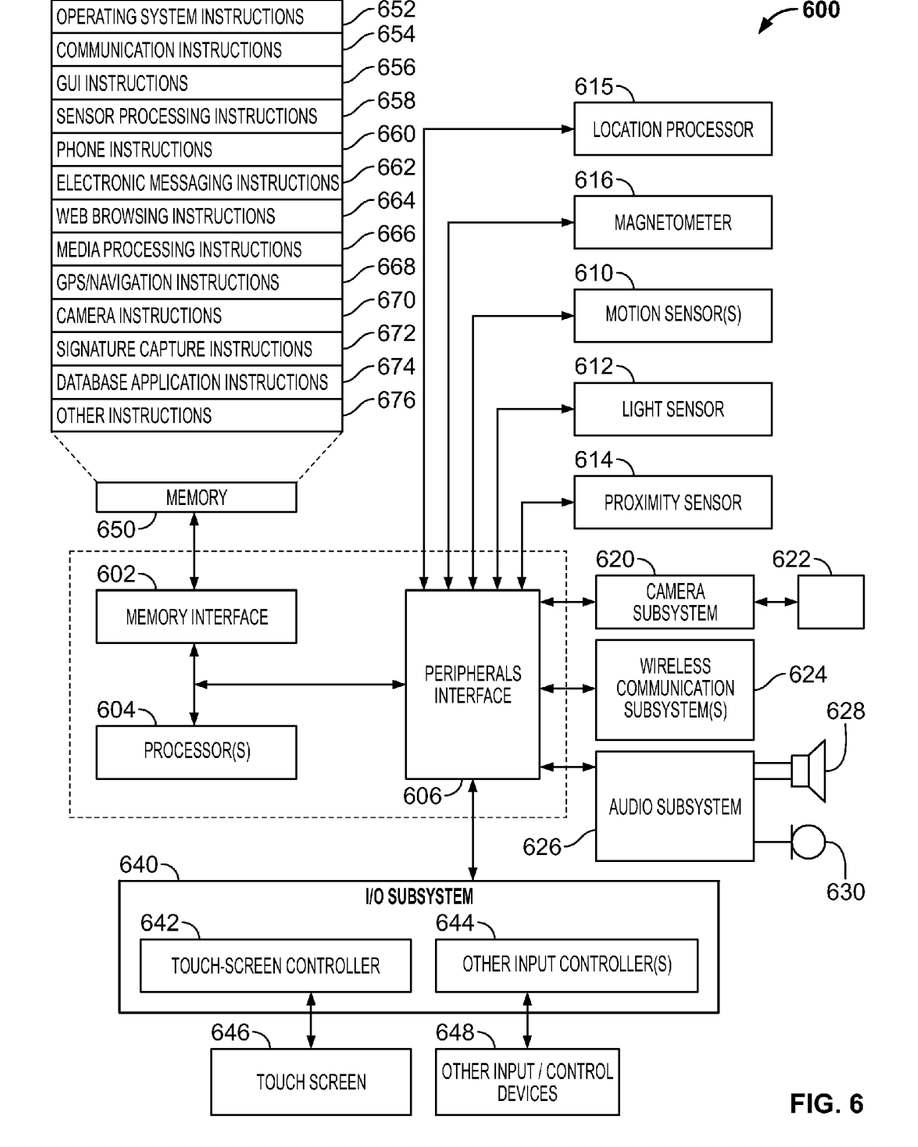
FIG. 6 is a block diagram of an exemplary device architecture that implements the features and processes described with reference to FIGS. 1-5.

FIG. 6 is a block diagram illustrating exemplary device architecture implementing features and operations described in reference to FIGS. 1-5. Device 600 can be any device capable of capturing handwriting on a touch sensitive surface, including but not limited to smart phones and electronic tablets. Device 600 can include memory interface 602, one or more data processors, image processors or central processing units 604, and peripherals interface 606. Memory interface 602, processor(s) 604 or peripherals interface 606 can be separate components or can be integrated in one or more integrated circuits. The various components can be coupled by one or more communication buses or signal lines.

Sensors, devices, and subsystems can be coupled to peripherals interface 606 to facilitate multiple functionalities. For example, motion sensor 610, light sensor 612, and proximity sensor 614 can be coupled to peripherals interface 606 to facilitate orientation, lighting, and proximity functions of the mobile device. For example, in some implementations, light sensor 612 can be utilized to facilitate adjusting the brightness of touch screen 646. In some implementations, motion sensor 610 (e.g., an accelerometer, gyros) can be utilized to detect movement and orientation of the device 600. Accordingly, display objects or media can be presented according to a detected orientation, e.g., portrait or landscape.

Other sensors can also be connected to peripherals interface 606, such as a temperature sensor, a biometric sensor, or other sensing device, to facilitate related functionalities.

Location processor 615 (e.g., GPS receiver) can be connected to peripherals interface 606 to provide geo-positioning. Electronic magnetometer 616 (e.g., an integrated circuit chip) can also be connected to peripherals interface 606 to provide data that can be used to determine the direction of magnetic North. Thus, electronic magnetometer 616 can be used as an electronic compass.

Camera subsystem 620 and an optical sensor 622, e.g., a charged coupled device (CCD) or a complementary metal-oxide semiconductor (CMOS) optical sensor, can be utilized to facilitate camera functions, such as recording photographs and video clips.

Communication functions can be facilitated through one or more communication subsystems 624. Communication subsystem(s) 624 can include one or more wireless communication subsystems 624. Wireless communication subsystems can include radio frequency receivers and transmitters and/or optical (e.g., infrared) receivers and transmitters. Wired communication system can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The specific design and implementation of the communication subsystem 624 can depend on the communication network(s) or medium(s) over which device 600 is intended to operate. For example, a mobile device can include communication subsystems 624 designed to operate over a GSM network, a GPRS network, an EDGE network, a WiFi or WiMax network, and a Bluetooth network. In particular, the wireless communication subsystems 624 can include For example, device 600 may include wireless communication subsystems designed to operate over a global system for mobile communications (GSM) network, a GPRS network, an enhanced data GSM environment (EDGE) network, 802.x communication networks (e.g., WiFi, WiMax, or 3G networks), code division multiple access (CDMA) networks, and a Bluetooth™ network. Communication subsystems 624 may include hosting protocols such that the mobile device 600 may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

Audio subsystem 626 can be coupled to a speaker 628 and one or more microphones 630 to facilitate voice-enabled functions, such as voice recognition, voice replication, digital recording, and telephony functions.

I/O subsystem 640 can include touch screen controller 642 and/or other input controller(s) 644. Touch-screen controller 642 can be coupled to a touch screen 646 or pad. Touch screen 646 and touch screen controller 642 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch screen 646.

Other input controller(s) 644 can be coupled to other input/control devices 648, such as one or more buttons, rocker switches, thumb-wheel, infrared port, USB port, and/or a pointer device such as a stylus. The one or more buttons (not shown) can include an up/down button for volume control of speaker 628 and/or microphone 630.

In one implementation, a pressing of the button for a first duration may disengage a lock of the touch screen 646; and a pressing of the button for a second duration that is longer than the first duration may turn power to mobile device 400 on or off. The user may be able to customize a functionality of one or more of the buttons. The touch screen 646 can also be used to implement virtual or soft buttons and/or a keyboard.

In some implementations, device 110 can present recorded audio and/or video files, such as MP3, AAC, and MPEG files. In some implementations, mobile device 110 can include the functionality of an MP3 player and may include a pin connector for tethering to other devices. Other input/output and control devices can be used.

Memory interface 602 can be coupled to memory 650. Memory 650 can include high-speed random access memory or non-volatile memory, such as one or more magnetic disk storage devices, one or more optical storage devices, or flash memory (e.g., NAND, NOR). Memory 650 can store operating system 652, such as Darwin, RTXC, LINUX, UNIX, OS X, WINDOWS, or an embedded operating system such as VxWorks. Operating system 652 may include instructions for handling basic system services and for performing hardware dependent tasks. In some implementations, operating system 652 can include a kernel (e.g., UNIX kernel).

Memory 650 may also store communication instructions 654 to facilitate communicating with one or more additional devices, one or more computers and/or one or more servers. Communication instructions 654 can also be used to select an operational mode or communication medium for use by the device, based on a geographic location (obtained by the GPS/Navigation instructions 668) of the device. Memory 650 may include graphical user interface instructions 656 to facilitate graphic user interface processing; sensor processing instructions 658 to facilitate sensor-related processing and functions; phone instructions 660 to facilitate phone-related processes and functions; electronic messaging instructions 662 to facilitate electronic-messaging related processes and functions; web browsing instructions 664 to facilitate web browsing-related processes and functions; media processing instructions 666 to facilitate media processing-related processes and functions; GPS/Navigation instructions 668 to facilitate GPS and navigation-related processes and instructions; camera instructions 670 to facilitate camera-related processes and functions; signature capture instructions 672 for the processes and features described with reference to FIGS. 1-5; and database application instructions. The memory 650 may also store other software instructions 676 for facilitating other processes, features and applications.

Perceptual Theory of Path Smoothness

When constructing paths for viewing, it can be observed that the human eye is sensitive to first and second order discontinuities in paths, and is fairly insensitive to third order discontinuities.

Figure 7A:
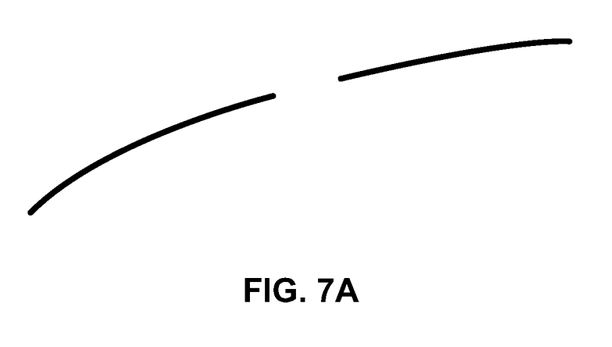
FIGS. 7A-7C illustrate a perceptual theory of path smoothness.

Referring to FIG. 7A, a path with a first order discontinuity is illustrated. First order discontinuity is caused when the position of the path changes in a discontinuous way, as when the endpoints of two adjacent Bézier curves are not co-located. This is an obvious and objectionable flaw in the path, but is easy to avoid.

Figure 7B:
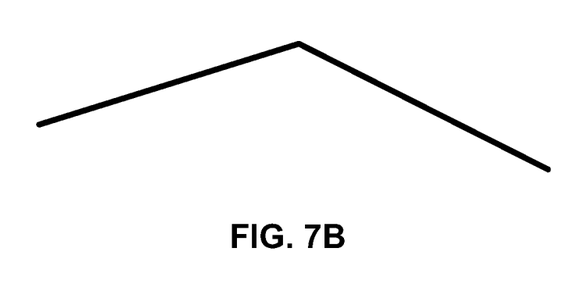

Referring to FIG. 7B, a path with second order discontinuity is illustrated. Second order discontinuity is caused when the direction of the path changes in a discontinuous way, creating a corner in the path. Paths composed of Bézier curves can only change in this way at the endpoints of each Bézier curve. The human eye is also quite sensitive to abrupt changes in direction such as this and a primary goal when constructing smooth paths is to avoid this sort of discontinuity.

Figure 7C:
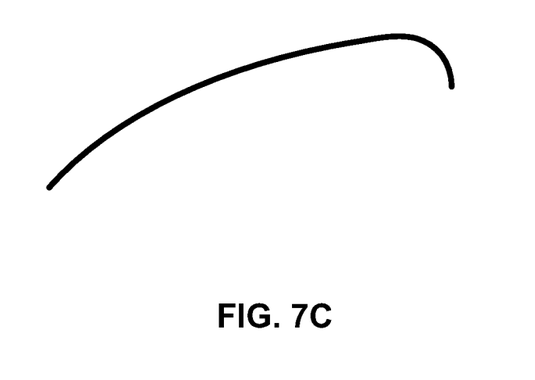

Referring to FIG. 7C, a path with a third order discontinuity is illustrated. Third order discontinuity is caused when the curvature of the path changes in a discontinuous way. Cubic splines generally avoid this by having the control points at the end of the adjoining Bézier curves lie on a line through the common data point and in opposite directions and equally distant from the point. This ensures that the curvature at the point changes continuously. The disclosed implementations avoid this, since it restricts the device from quickly and closely following the path being created by the user and provides little esthetic benefit. As can be seen from the curve in FIG. 7C, which joins two Bézier paths with very different curvatures, as long as first and second order continuity is maintained at the junction of the curves, the change in curvature is not objectionable and is not generally even perceived as a discontinuity. Consequently, the curve appears smooth to the human eye.

When constructing paths solely for human viewing, esthetics is the only smoothing criterion, so it is practical to allow discontinuous changes in curvature along the path. This can be seen when the control points for the Bézier curves are shown on the path. Adjoining Bézier curves have a common endpoint, and the control points for the adjoining curves lie on a line through their common endpoint, but not generally be equally distance from it. This allows discontinuous curvature at that point, but the perceptual smoothness of the path remains good. This allows greater flexibility in following the path being drawn by the user and avoids the need to attempt to adjust the curves to a high degree of precision in the milliseconds available for drawing each curve. As a result, responsiveness and feedback will remain good and the lag in drawing each segment is generally not perceptible.

It should also be noted that the degree of discontinuity is limited by the change in curve length from one Bézier curve to the next. Since the drawing is limited to physical devices and these devices accelerate and decelerate fairly smoothly from one data point to the next, and since the distance between the data points is used to derive the magnitude of the control points, in practice the discontinuity between curves tends not to be great.

In practice, constructing a usable set of rules that embodies these principles requires consideration of additional details such as maximum and minimum distance between data points, speed with which Bézier curves can be calculated and drawn, handling of boundaries, user feedback, and other factors. Drawing paths which are largely obscured by the drawing implement (e.g., a finger), for instance, can be difficult to do accurately. Offsetting the path so that it is visible while drawing can be unsettling to typical users, making it an impractical solution. Also, most glass touch screens have far too much friction for drawing with fingers (which are also very high friction, by design). The disclosed implementations provide satisfactory results while working within these limitations and maintaining user expectations.

Each of the above identified instructions and applications can correspond to a set of instructions for performing one or more functions described above. These instructions need not be implemented as separate software programs, procedures, or modules. Memory 650 can include additional instructions or fewer instructions. Furthermore, various functions of the mobile device may be implemented in hardware and/or in software, including in one or more signal processing and/or application specific integrated circuits.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to, communicate with, one or more mass storage devices for storing data files; such devices include magnetic disks, such as internal hard disks and removable disks; magneto-optical disks; and optical disks.

Storage devices suitable for tangibly embodying computer program instructions and data include all forms of non-volatile memory, including by way of semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a player, the features can be implemented on a computer having a display device, such as a CRT (cathode ray tube) or LCD (liquid crystal display) monitor for displaying information to the player. The computer can also have a keyboard and a pointing device such as a game controller, mouse or a trackball by which the player can provide input to the computer.

The features can be implemented in a computer system that includes a back-end component, such as a data server, that includes a middleware component, such as an application server or an Internet server, or that includes a front-end component, such as a client computer having a graphical user interface or an Internet browser, or any combination of them. The components of the system can be connected by any form or medium of digital data communication such as a communication network. Some examples of communication networks include LAN, WAN and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
receiving data points generated by handwriting on a touch sensitive surface of a touch sensitive device;
determining, at the touch sensitive device, characteristics of curves connecting the data points based on magnitudes and directions of control points associated with the curves, where the control points are derived from a set of rules and at least one magnitude is modified using a smoothing adjustment factor based on processing speed and resolution of the touch sensitive device; and
rendering, on the touch sensitive device, the curves having the determined characteristics to provide a digital image of the handwriting,
where the method is performed by one or more hardware processors of the touch sensitive device.

2. The method of claim 1, further comprising:
cropping an area on the touch sensitive display that includes the rendered curves; and
adding a border around the cropped area.

3. The method of claim 2, further comprising:
adding a transparent background to the cropped area; and
storing the cropped area with the transparent background in a digital image format.

4. The method of claim 1, where the curve is a Bézier curve.

5. The method of claim 1, where determining characteristics of curves connecting the data points further comprises:
determining that a distance between two data points is less than a line width.

6. The method of claim 1, further comprising:
determining that a distance between two data points is greater than a line width and less than a scale factor multiplied by a line width; and
rendering a straight line segment connecting the two data points.

7. The method of claim 1, where deriving a control point further comprises:
deriving a beginning control point of a curve from first and third data points taken from a set of four consecutive data points, the generating including setting the direction and magnitude of the beginning control point.

8. The method of claim 7, further comprising:
setting the direction of the beginning control point to be the same as a direction vector from the first to third data points.

9. The method of claim 8, further comprising:
setting the magnitude of the beginning control point using a distance between the second and third data points.

10. The method of claim 9, further comprising:
modifying the magnitude using a smoothness adjustment factor which is derived by applying a power function to the distance between the second and third data points.

11. The method of claim 10, further comprising:
multiplying the modified magnitude by a constant factor which is determined heuristically from the processing speed of the touch sensitive device and the resolution of a touch sensitive display of the touch sensitive device.

12. The method of claim 1, further comprising:
deriving an end control point of a curve from second and fourth data points taken from a set of four consecutive data points, the generating including setting the direction and magnitude of the end control point.

13. The method of claim 12, further comprising:
setting the direction of the end control point to be the same as a direction vector from the fourth to the second data points.

14. The method of claim 13, further comprising:
setting the magnitude of the end control point using a distance between the second and third data points.

15. The method of claim 14, further comprising:
modifying the magnitude using a smoothness adjustment factor, which is derived by applying a power function to the distance between the second and third data points.

16. The method of claim 15, further comprising:
multiplying the modified magnitude by a constant factor, which is determined heuristically from the processing speed of the touch sensitive device and the resolution of a touch sensitive display of the touch sensitive device.

17. A system comprising:
a touch sensitive surface of a touch sensitive device;
one or more processors of the touch sensitive device;
memory configured for storing instructions, which, when executed by the one or more processors, causes the one or more processors to perform operations comprising:
receiving data points generated by handwriting on the touch sensitive surface of the touch sensitive device;
determining, at the touch sensitive device, characteristics of curves connecting the data points based on magnitudes and directions of control points associated with the curves, where the control points are derived from a set of rules and at least one magnitude is modified using a smoothing adjustment factor based on processing speed and resolution of the touch sensitive device; and
rendering, on the touch sensitive device, the curves having the determined characteristics to provide a digital image of the handwriting.

18. The system of claim 17, where deriving a control point further comprises:
deriving a beginning control point of a curve from first and third data points taken from a set of four consecutive data points, the generating including setting the direction and magnitude of the beginning control point.

19. The system of claim 17, where deriving a control point further comprises:
deriving an end control point of a curve from second and fourth data points taken from a set of four consecutive data points, the generating including setting the direction and magnitude of the end control point.

20. The system of claim 17, further comprising:
cropping an area on the touch sensitive display that includes the rendered curves;
adding a border around the cropped area;
adding a transparent background to the cropped area; and
storing the cropped area with the transparent background in a digital image format.

* * * * *